(12) United States Patent
Bruce et al.

(10) Patent No.: US 6,741,724 B1
(45) Date of Patent: May 25, 2004

(54) METHOD AND SYSTEM FOR FORM PROCESSING

(75) Inventors: Ben F. Bruce, Arlington, TX (US); Shahrom Kiani, Arlington, TX (US); Brenda J. Bishop-Jones, Portland, OR (US); Gert J. Seidel, Constance (DE); Linda J. Kessler, Washington, DC (US)

(73) Assignee: Siemens Dematic Postal Automation, L.P., Arlington, TX (US)

( * ) Notice: Subject to any disclaimer, the term of this patent is extended or adjusted under 35 U.S.C. 154(b) by 0 days.

(21) Appl. No.: 09/534,182

(22) Filed: Mar. 24, 2000

(51) Int. Cl.$^7$ .................................................. G06K 9/00
(52) U.S. Cl. ...................... 382/101; 382/112; 382/310; 705/60; 705/402; 705/407; 705/410
(58) Field of Search ................................. 382/101, 112, 382/181, 182, 183, 188, 218, 219, 220, 221, 309, 310, 311; 700/219; 705/60, 62, 401, 410, 61, 407, 402; 414/593

(56) References Cited

U.S. PATENT DOCUMENTS

| | | | |
|---|---|---|---|
| 5,422,821 A | * 6/1995 | Allen et al. | 700/219 |
| 5,703,783 A | 12/1997 | Allen et al. | 364/478.01 |
| 5,748,807 A | * 5/1998 | Lopresti et al. | 382/310 |
| 5,889,897 A | * 3/1999 | Medina | 382/310 |
| 5,925,864 A | * 7/1999 | Sansone et al. | 235/375 |
| 5,974,147 A | * 10/1999 | Cordery et al. | 705/62 |
| 6,028,970 A | * 2/2000 | DiPiazza et al. | 382/309 |
| 6,373,965 B1 | * 4/2002 | Liang | 382/112 |

* cited by examiner

Primary Examiner—Jayanti K. Patel
Assistant Examiner—Abolfazl Tabatabai
(74) Attorney, Agent, or Firm—Philip G. Meyers

(57) ABSTRACT

The invention provides a method of processing an information form such as a postal change of address form. Such a form includes various data elements, such as a name of a person submitting the form and the information on which action is to be taken. In the case of mail forwarding, these data elements would include, for example, the name of the person that wishes mail to be redirected, an old address to which mail for that person was previously sent, and a new address to which mail for that person should be sent. Such a method includes the steps of scanning a sheet having written information thereon reflecting the data elements to obtain an image, processing the image with character recognition logic to obtain text data corresponding to the written information, analyzing the text data with a computer to determine a scanning error probability therein, if the scanning error probability exceeds a predetermined limit, attempting to correct such error by editing of the text data by at least one of a computer using predetermined correction criteria and a human operator viewing the text data, checking one or more elements of the text data (such as a new address and an old address) against a first database of valid data elements (e.g., a postal address database), if the element is found in the first database, updating a second database such as a National Change of Address (NCOA) database to include at least new or revised text data, and rejecting the text data and aborting updating the second database for such text data that cannot be corrected. The invention further provides a system for processing a series of change of information forms such as COA forms, which system is capable of carrying out the foregoing process.

25 Claims, 3 Drawing Sheets

METHOD AND SYSTEM FOR FORM PROCESSING

TECHNICAL FIELD

The present invention relates to the automated and semi-automated processing of forms, in particular to the handling of change of address forms submitted by postal customers.

BACKGROUND OF THE INVENTION

According to current United States Postal Service (USPS) procedures, a person wishing to have the USPS forward mail to a new address submits a Change of Address (COA) Order Form (Form 3575) that requests mail forwarding. In some cases, the postal carrier may file a COA From 3575z on behalf of a person who has moved. Form 3546 is filed in order to modify an existing change of address order. All three of these postal forms and others of similar nature are COA forms within the meaning of the present invention.

Form 3575 is normally completed by hand-printing the requested information including name, old address, new address, effective date and duration of the change on the form and submitting the form to a local post office. In many cases, the form is turned in at a local post office at the location of the new residence. In such a case, the form is first forwarded to the original delivery unit (the former local post office) where certain information is manually copied from the Form 3575 to a Form 3982, and the postal carrier for the old address manually enters the forwarding information onto a list applicable to his or her route. The Form 3575 is then forwarded to a regional center termed a Computerized Forwarding System (CFS) Unit where the information is keyed in manually by operators and entered into a regional change of address database associated with that CFS Unit. The CFS Unit prints a label indicating the customer's new address and affixes it to the original Form 3575. The original Form 3575 is then sent back to the customer's old address local post office where it is reviewed by the carrier for verification/correction and kept on file for a limited period of time as proof that a valid change of address order is on file for 18 months in case the forwarding order is ever questioned. Periodically, the COA data from the regional CFS Units are uploaded to the National Customer Support Center (NCSC) in Memphis, Tenn. This data is processed and combined into a single national directory and distributed weekly back to the regional CFS Units.

This process is labor-intensive, expensive and prone to error. Since the information is hand-written by the customer and transcribed at least twice by the postal service, the chance for an error is magnified. Considerable labor and expense are involved in the process of forwarding the COA form from the new local post office to the old, as often happens when a person moves without knowing in advance where they will ultimately be living. The manual archiving of the COA forms at local post offices is also costly. Since errors in forwarding do occur and no mechanism is in place at present for notifying a customer of a problem, the USPS receives numerous complaints attributable to forwarding and change of address problems via the USPS 800 number. The workload and expense of maintaining such a service would be greatly reduced if forwarding requests could be handled in a manner more efficient and less prone to error.

More recently, it has become possible to generate a COA form from the U.S. Postal Service web site (www.usps.gov) on the Internet. The COA process leads the customer through a series of form screens that solicit all of the required information and checks both the new and old addresses for validity. If one of the addresses is not in the database, an error is generated and the customer cannot go further in the process until a valid address is entered. When the form is completed, the information is printed out along with several legal notices, and the customer is instructed to sign the form and then mail it in or deliver it in person to a local post office.

While this semi-automated procedure reduces the possibility of keyboard entry errors beyond the customer's control and prevents the customer from inadvertently entering an invalid address, public acceptance has been slow and a large number of people will continue to rely on the traditional paper COA form for the foreseeable future. The change of address order must be signed by the customer, and thus it is not possible to completely automate the change of address process through a network such as the Internet unless some means of authentication, such as a digital signature, is employed. This option may become available as an alternate route in the future, but a vast majority of persons will continue to opt for the existing change of address procedure wherein the customer need only fill out a COA form and the postal service does the rest.

A need has therefore arisen for an automated or semi-automated system for handling COA forms that reduces the level of manual keyboard entries required without radically changing the way COA forms are filled out by the postal customer. U.S. Pat. Nos. 5,422,821 and 5,703,783 suggest the possibility of using a machine for the intercepting and forwarding of incorrectly addressed mail for the additional purpose of handling COA forms. However, the system described was designed for handling mail, not forms. The present invention provides a method and system specifically designed for handling COA forms and other similar informational forms.

SUMMARY OF THE INVENTION

The invention provides a method of processing an information form such as a postal change of address forms. Such forms include various data elements, such as a name of a person submitting the form and the information on which action is to be taken. In the case of mail forwarding, these data elements would include, for example, the name of the person that wishes mail to be redirected, an old address to which mail for that person was previously sent, and a new address to which mail for that person should be sent. Such a method of the invention includes the steps of:

(a) scanning a sheet having written information thereon reflecting the data elements to obtain an image;

(b) processing the image with character recognition logic to obtain text data corresponding to the written information;

(c) analyzing the text data with a computer to determine a scanning error probability therein;

(d) if the scanning error probability exceeds a predetermined limit, attempting to correct such error by editing of the text data by at least one of a computer using predetermined correction criteria and a human operator viewing the text data;

(e) checking one or more elements of the text data (such as a new address and an old address) against a first database of valid data elements (e.g., a postal address database);

(f) if the element is found in the first database, updating a second database such as a National Change of Address (NCOA) database to include at least new or revised text data; and (g) rejecting the text data and aborting updating the second database for such text data that cannot be handled in steps (d)–(f).

The invention further provides a system for processing a series of change of information forms such as COA forms, which system is capable of carrying out the foregoing process. The system includes a scanner capable of successively scanning a series of sheets having written information thereon to obtain an image from each sheet, first character recognition logic operable on a computer, which character recognition logic generates text data corresponding to the written information from each image, error probability logic operable on a computer that analyzes the text data to determine a scanning error probability for the text data, a first database of valid data elements, validation logic operable on a computer for checking one or more designated elements of the text data against the first database, a video encoding station usable by a human operator to view, edit and/or enter the text data, and handling logic operable on a computer which includes modules for:

(i) if the designated data element is found in the first database, updating a second database to include new or revised text data;

(ii) if the scanning error probability exceeds a certain predetermined limit or the validation logic is unable to find the designated element in the first database, referring the text data to the human operator for review and editing; and (iii) rejecting the text data and aborting updating the second database for such text data that cannot be corrected by the human operator. The computer referred to may be a single computer capable of performing all the recited tasks, a separate computer associated with each task, or a combination of single and multi-task computers.

In accordance with a further aspect of the invention, a process is provided for handling the flow of change of address information within a postal service including a multitude of local delivery units at which address changes or other change orders may be filed. Such a process includes the steps of:

(a) completing a handwritten or printed change of address information form, which form includes at least the name of the person to whom the change applies, a former address, and a new address;

(b) depositing the change of address form with the postal service, preferably with one of the local delivery units;

(c) forwarding the change of address form to a processing facility;

(d) at the processing facility, scanning the form to obtain an image thereof and creating change of address text data based on the scanned image;

(e) updating a change of address database using the change of address text data; and (f) notifying a local delivery unit responsible for delivery of mail to the former address of the change using the change of address text data. An additional step (g) of saving the image on a permanent data storage medium for future retrieval is preferred. Preferably, step (f) generates a report or intermediate form for which the data is sent electronically, such as through a network, and the hard copy report or form is generated based on the change of address text data. These and other aspects of the invention are further discussed in the detailed description which follows.

BRIEF DESCRIPTION OF THE DRAWINGS

In the accompanying drawings, wherein like numerals denote like elements.

DETAILED DESCRIPTION

Figure 1:
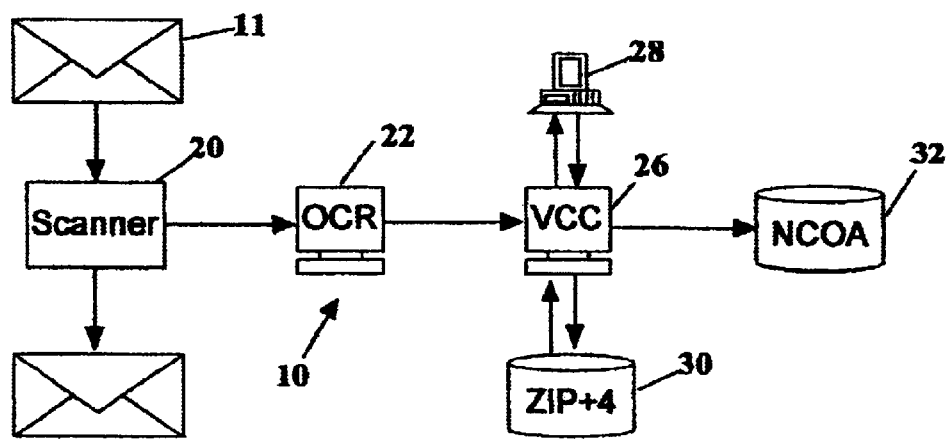
FIG. 1 is a schematic diagram of a first embodiment of a system according to the invention.

FIG. 1 illustrates a simple version of a system according to the invention for handling a series of COA forms 11. COA forms 11 are scanned one at a time by a scanner 20. The image data is sent to an optical character recognition module 22 that creates text data based on the image. Such OCR software may or may not be specifically designed to read the form then in use, i.e., may scan only certain predetermined areas of the form for each data field, such as "former address-street" for an area of the image corresponding to the blank having that description on the form. The software may also pick up areas outside the blanks for those inevitable persons who cannot stay inside the lines. In either case, the OCR software ignores the preprinted data on the form. Making such print of a specific color that the scanning software filters out during the scan can facilitate this. The scan also preferably promotes portions of the image which correspond to data to a uniformly dark image density.

The text data in the form of a electronic data stream is sent to a Video Coding Computer (VCC) 26 along with a copy of the image data from scanner 20. If OCR module 22 is offline or is omitted from the system, then only the image data is sent. Although it is possible to practice the invention with complete addresses, VCC 26 preferably performs an extraction coding operation that converts the address data to an abbreviated coded format including enough information to uniquely identify the address. Additional information such as an apartment number could be appended if necessary. VCC 26, if it has received text data from module 22, performs a check in an address verification database 30 using the extraction code to determine if the former address and new address listed on the COA form are valid. It does not attempt to check the name of the person submitting the COA form at this stage. Verification database 30 may be, for example, a locally accessible copy of the USPS ZIP+4 database, which cross-references delivery point ZIP codes for all destination addresses known to the USPS.

If either the old address or new address is not valid, the operation may either be aborted for that COA form, or diverted for manual review to VDT 28. If one address is found valid but not the other, an optional error notification may be generated by sending an email or postcard to the submitter, using the name as scanned, to whichever of the addresses was found valid. If the postal service does not wish to undertake the expense of physical mailing of error notifications, a blank can be provided on the form for the submitter's email address, with instructions to the effect that acknowledgment of the change or notification that the change of address was rejected will only be sent if the submitter provides an email return address. In either case, the notification advises the submitter that the change of address did not take effect, and may specify the reason why, in this case because either the forwarding or former address was not recognized.

In practice, since no attempt is made at OCR error recognition or correction in this embodiment other than by human review, only a portion of scanned forms will prove to have valid new and old addresses. All other forms are sent to Video Display Terminal 28 for review by the human operator. The operator sees a video screen including a copy of all or part of the original scanned image and a form for the text data, which may either be blank or fully or partially filled in with the results of the OCR operation and validation of the addresses. After the human operator has completed review and editing, VCC 26 formats, buffers, and ultimately posts the resulting change of address data to the regional database 31 and/or the National Change of Address database 32.

In this embodiment, neither the computer, VCC 26, nor the human operator has the means available to validate the name of the person moving as well as the addresses. In a preferred form of the invention, verification database 30 also contains a copy of the relevant information from the NCOA database 32, allowing VCC 26 to verify whether the person listing the old address actually receives mail there. In the event of a spelling error in the name, the human operator could pull up a list of persons receiving mail at the old address given on the COA form to see if an obvious error has been made (scan says "John Smitk", but database lists "John Smith") and, if so, correct the error manually.

Figure 2:
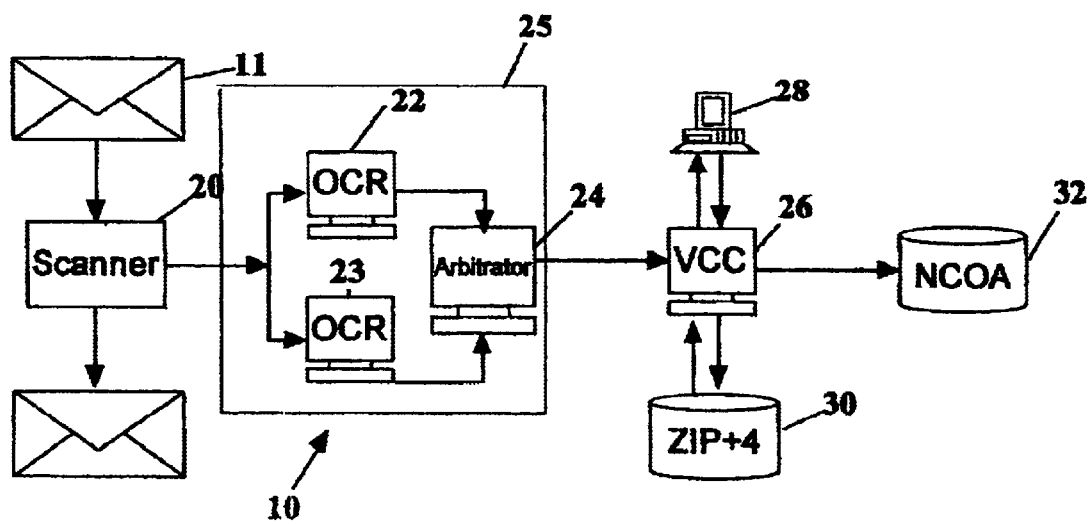
FIG. 2 is a schematic diagram of a second embodiment of a system according to the invention.

FIG. 2 illustrates an enhanced version of the system of FIG. 1 in which the image data from scanner 20 is sent to two or more different OCR modules 22 and 23 provided with the different character recognition software. Each module 22, 23 generates text data stored in memory which is the output of the OCR process. Such source data is transmitted to an arbitrator 24 which performs a comparison of the results of the two scans and creates composite data reflecting both scans. Where the data from each scan is consistent, e.g. both OCR routines agree that the form sender's name is John H. Doe, the composite data is identical to each source data. If the source text data elements are not consistent, then the composite data can include two or more options, one from each source corresponding to modules 22 and 23, and resumes the consensus text once the difference ends. The resulting composite text data for the name of the person submitting the change of address might be as follows: Scan #1: John H. Doe Scan #2: Jonn H. Doe Composite: Jo[h/n]n H. Doe Preferably, the OCR software in accordance with existing standards assigns each scanned character a probability of being correct. The output includes the character most likely to represent the one scanned and also one or more second (and third) choice characters in descending order of probability. The word "John" might have been analyzed by each module 22, 23 as follows:

|  | 1 | 2 | 3 | 4 |
|---|---|---|---|---|
| Module 22 Scan Probabilities | | | | |
| Letter | J | o | h | n |
| % chance | 90 | 92 | 92 | 91 |
| Letter | I | u | n | m |
| % chance | 40 | 39 | 63 | 49 |
| Letter | L | a | k | w |
| % chance | 10 | 8 | 7 | 6 |
| Module 23 Scan Probabilities | | | | |
| Letter | J | o | n | n |
| % chance | 91 | 89 | 58 | 87 |

| | 1 | 2 | 3 | 4 |
|---|---|---|---|---|
| -continued | | | | |
| Letter | I | u | h | m |
| % chance | 42 | 44 | 56 | 49 |
| Letter | L | e | k | w |
| % chance | 12 | 11 | 43 | 9 |

(To convert the foregoing probabilities to percent chance of error, subtract the number given from 100%.) In accordance with the invention, arbitrator 24 or its equivalent in the case of a single scanner and single OCR logic setup (FIG. 1) contains rules for determining when the level of uncertainty of the accuracy of the text data is so high that the text data is presumed to contain an error. The actual probability level(s) at which this will occur is preferably defined by the user and stored as a parameters file that the software reads prior to use.

The arbitration rules contain logic for dealing with differences between the results from the OCR modules, preferably on a character by character basis. For example, in the case of the third letter in the name John, module 22 was reasonably certain it was an h with 92% confidence, whereas module 23 did not reach a clear decision, rating h and n almost the same with a much lower probability level. In such a case, as where the top choice of one module is 90% or more (i.e., 10% or less chance of error) and the top choice of the second differs and has a 30% or greater chance of error, then arbitrator 24 resolves the conflict in favor of the lower percentage chance of error and does not flag the character as an error or wildcard character. These levels are user-defined to provide the desired overall process accuracy, with the understanding that the overall chance of an error can be reduced almost to zero, but that in such a case a larger number of forms will have to be referred to a human operator for editing or confirmation. The arbitration rules as described herein thus select the character from the version having a lower error probability than the character from the other version only when the character in with the lower error probability has an error probability lower than a first, predetermined level, and the character in the other version at the same position in the text data has an error probability higher than a second, predetermined level which is higher than the first predetermined level, preferably at least 10% higher than the first predetermined level.

Other such rules might require that, even if the OCR results agree, the character will be marked as an error if either OCR module rated the error probability level higher than a predetermined amount, such as 15%. If OCR modules 22, 23 thus encounter a symbol that cannot be interpreted with sufficient confidence, a wild card character such as a question mark is inserted at that position along with the most likely possibilities, and the text data preferably along with the image data (bitmap or other graphics file) are sent to the human operator for review at VDT 28.

The arbitration rules may also include global rules relating to the overall confidence level of the text data rather than resolution of specific characters. For example, a rule may depend on an average of the highest probability levels for all characters. The rule may require that if the average probability of error for all of the characters in the text data is not a predetermined amount (e.g., 5% or less), then the message will be referred to a human operator for review even if no single character was rated as ambiguous. The text data is therefore referred to a human operator for review if it contains one or more ambiguous characters, or if its overall confidence level, whether determined as a simple numerical average or by more complex rules of statistics, fails to reach a desired level. Either or both of these conditions can be the basis for deciding that the error probability of the text data is less or greater than a predetermined limit for purposes of the invention.

Modules 22, 23 and arbitrator 24 may represent different software routines that run on the same computer. However, in order improve the throughput of the system, it is preferred to provide a separate processor for each of these components so that each can operate concurrently. A dual processor SMP (symmetrical multi processor) computer is preferred as the image handling computer (IHC) 25 that runs software implementing the logic of modules 22, 23 and arbitrator 24. The composite text, still in the form of a electronic data stream, is sent to video coding computer (VCC) 26.

An important goal of the system and method of the invention is to refer as few forms as possible to a human operator for manual review given the overall error rate desired. "Overall error rate" in this context means the number of change of address forms which pass through the system with incorrect information that remains undetected, such that an incorrect entry is made in the regional database 31 or the National Change of Address 32 database, or that the change or failure to make a change otherwise leads to a customer complaint or inquiry. For this purpose, VCC 26 preferably includes automatic error detection logic that deals with as many different types of errors as possible without human intervention. Easily detectable errors include fields or blanks on the form that were not filled in at all, or filled in inadequately. If VCC 26 cannot compile a complete coded form of address, it will refer the form to a human operator for review. Preferably all forms are either submitted directly to the regional or national change of address database as correct, or else referred to a human operator if there is a predetermined level of uncertainty in the data submitted. VCC 26 does not itself decide to reject a form without review by a human operator except possibly in extreme cases, e.g., a blank form or one with little intelligible text.

VCC 26 can, for example, determine that the data element for a field such as zip code is incomplete or of an incorrect length (as where only 4 digits in the 5-digit zip code are given). A human operator may be able to resolve such an error using other information, for example, the street address and city. If after human review the address cannot be resolved, processing for that form aborts, and an error notification to the submitter may be generated as described above.

VCC 26 could also include a spell check function referencing a database of words used in possible addresses, and flagging for review any word that appears misspelled. VCC 26 can also include an auto-correct function for errors that can be resolved automatically by reference to the verification database. For example, if "Sage" is misspelled as "Sge", VCC 26 could try coded addresses using various spell-corrected alternatives (Sage, Saga, Sagi(naw), Sagu(enay)) to see if one of these matches an entry in database 30. If only one match is detected, the system could either make the change automatically and/or refer it to a human operator for confirmation.

Similarly, where the composite string data from the scan reveals an inconsistency, or if arbitrator 24 contains one or more wild card characters, VCC 26 may be programmed to attempt to resolve the problem electronically before referring the data to a human operator. For example, in the case of an inconsistency between the two scans, VCC 26 may check both versions against the ZIP+4 database 30 to determine if one matches and not the other. If a match is found, that address is selected and the data concerning the inconsistency is dropped. Where there are multiple inconsistencies, VCC 26 may try all or up to a predetermined number of permutations before giving up. As a result of the foregoing steps, forms which are found correct after computer correction can be entered and validated automatically or sent to a human operator for confirmation.

Forms which are fatally incomplete may be rejected automatically as described above, but this is not preferred in the case of change of address forms, since a human operator may be able to resolve the problem even if it contains omitted information by reference to verification database 30. For example, if the city is missing but the zip code is correct, the zip+4 database can be used to generate the correct city from database 30. The composite data for a form is sent to a human operator for display and editing at VDT 28 if it has not been assigned to one of the foregoing categories by VCC 26.

Form data that has been validated may then be formatted in accordance with the requirements of the change of address database, in this example the NCOA database 32, to create an electronic record of the original paper form. Such records may held in memory and/or saved to a storage medium such as a hard disk drive. Intermittently, a batch of completed, validated records will be uploaded to the NCOA database 32. VCC 26 may include logic for performing a buffering function so that the number of records uploaded does not exceed the input capacity of the NCOA database 32. The upload operation may conducted in any manner desired, and may include steps of checking for redundant or inconsistent entries in the NOA database 32.

If the consensus text data contains one or more inconsistencies or wild card characters that VCC 26 is unable or not programmed to resolve on its own, the data is sent electronically to VDT 28 as in the previous embodiment for manual editing (fractional coding). The consensus text data with wild card characters and inconsistencies between the OCR scans highlighted is presented to the operator for review. Optionally, the operator may also view the corresponding image from scanner 20, which will be archived instead of the original paper COA form and provides a useful check on the character data determined from the scan(s). A video screen display including both all or part of the original image and an on-screen form containing the text data is most preferred.

The operator may access the address database 30 in order to fill in on-screen blanks and make corrections by entering just the extraction coded form of the corrected address rather than the complete address. VCC 26 can also present a list of possible addresses that are consistent with the composite data string, and the operator can choose one address from the list, or if no decision can be made, mark the data for rejection. If the inconsistent or wildcard character is in the name of the submitter or on another part of the form, the operator can select either of the OCR interpretations of the scanned characters, or can override and fill in the missing text manually. After editing is completed, the edited data is ready for further processing by VCC 26, for example, saved and stored for updating to the NCOA database 32, or saved and stored as a list of COA rejection notices to be sent, as appropriate.

Figure 3:
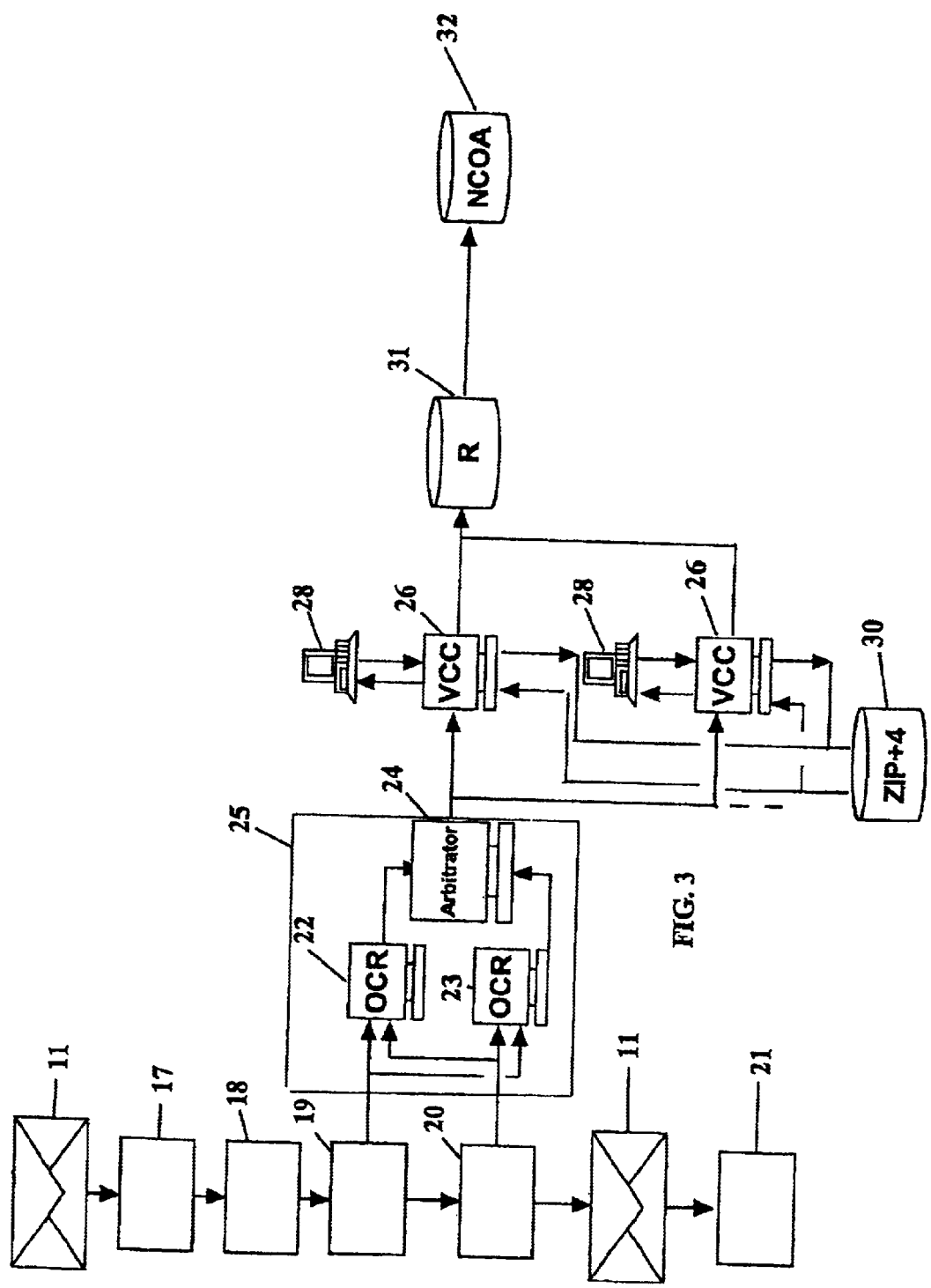
FIG. 3 is a schematic diagram of a third embodiment of a system according to the invention.

FIG. 3 illustrates a more complex embodiment of the invention designed to achieve a higher overall accuracy and reduced human review. A mail piece feeder 17 of a type known in the art that receives a series of paper COA forms 11 which have, for example, been collected and batched together for processing. Feeder 17 receives a stack of such forms 11 manually or automatically loaded therein and feeds the forms one at a time to a printer 18 that prints an ID number and/or other indicia such as a bar code on each form 11. The forms 11 are then sent through two or more optical scanners, preferably a pair of line scanners 19, 20 arranged in series. Each scanner 19, 20 creates an image of the operative side of the form that is associated with the assigned ID number and showing the ID number. The stack of forms 11 is then stored for the required amount of time, then sent to a recycling facility 21.

Second scanner 20 preferably scans at different settings (contrast, dot density, color sensitivity, etc.) than the first scanner 19 so that the scans represent a variety of scanning conditions. In this manner, one scan may pick up a faint marking that the other misses. Different scan conditions including the wavelength of light used to make the scan may also help to resolve situations where consumers have used a variety of ink colors such as red, blue or black to complete the COA form. Modules 22, 23 receive separate signals from each of the scanners 19, 20. Each image is associated in computer memory with the assigned and printed ID number, which may for example be stored as an array and then used as the file name when the image file(s) are archived to a permanent storage medium as described hereafter. It is also possible for each OCR module 22, 23 to receive the results from each scanner 19, 20 as indicated in FIG. 3, resulting in four different versions of the text data that are then compared by arbitrator 24.

In a large data center, such as a national or regional center set up to handle form processing according to the invention, there may be a number of VCC's 26 and operators at VDT's 28 that receive text data and images for correction from computer 25. For this purpose, computer 25 may distribute work evenly among the different workstations or send text data requiring review to the next available operator by continually polling VCC's 26 for a signal indicating that the human operator is ready for a new record to review. If the system is organized on a regional basis, then the results of each successful form processing operation will be sent to a regional database 31, and updates from each regional database 31 to the NCOA database 32 are posted intermittently in batches. The ID number assigned at the start is carried along throughout the process with both the image data and text data, and may be used later as a rapid way of recalling an image that corresponds to a given ID number listed along with the text data.

Handwriting recognition has known limitations and limits the effectiveness of the process of the invention. As an alternative to the use of handwriting recognition software, the COA form completed by the postal customer may also require the submitter to complete machine-scanable blanks each of which corresponds to a character (letter, number, etc.) Most users are familiar with machine-scanned multiple choice forms completed with dark pencil. This option reduces or eliminates the need to scan and interpret handwriting, but requires a larger form with a grid of blanks, such as about forty for each letter or number to be filled in on the form. The larger form may still be preferable in that it would greatly reduce the incidence of mis-scans or failure to correctly interpret the hand-written statement. However, it may be especially advantageous to employ a hybrid system wherein only the name of the person whose mail is to be forwarded is written in machine-scanable code symbols such as bar codes or filled in blanks, since this information may not be available in the verification database 30.

The system of the invention can also be used to process forms generated using the USPS Internet change of address system as described above. These forms will be printed rather than hand written and will thus be much easier to scan. If desired, the system can be programmed to recognize an Internet-generated COA form and skip the address check for such forms, since this was done previously when the form was generated. According to a preferred form of this embodiment, the web server that generated the form for the consumer also creates a coded, representation of the data that is more readily machine scanable than handwriting or printed alphanumeric character, such as a bar code, and prints it out on the form along with the printed alphanumeric text. When the system receives the form, the information can be scanned more reliably by scanning of the bar codes rather than using character recognition. Bar codes can be made compact and would not greatly enlarge the form. Other symbol systems could be used in place of bar codes, such as alternative alphabet wherein the characters are each designed for optimum machine readability. In one such system, letters can be constructed from combinations of very simple geometric symbols such as dots and dashes (Morse code), combinations of open and closed circles, and the like. This embodiment of the invention offers the possibility of near error-free automation. A single national processing center could be provided for Internet-generated forms of this kind, whereas hand-written forms could continue to be processed on a regional basis until the number thereof dwindles in comparison to the number generated though the Internet. If any case, OCR modules 22, 23 can be supplemented or replaced by appropriate symbol recognition modules as required.

Figure 4:
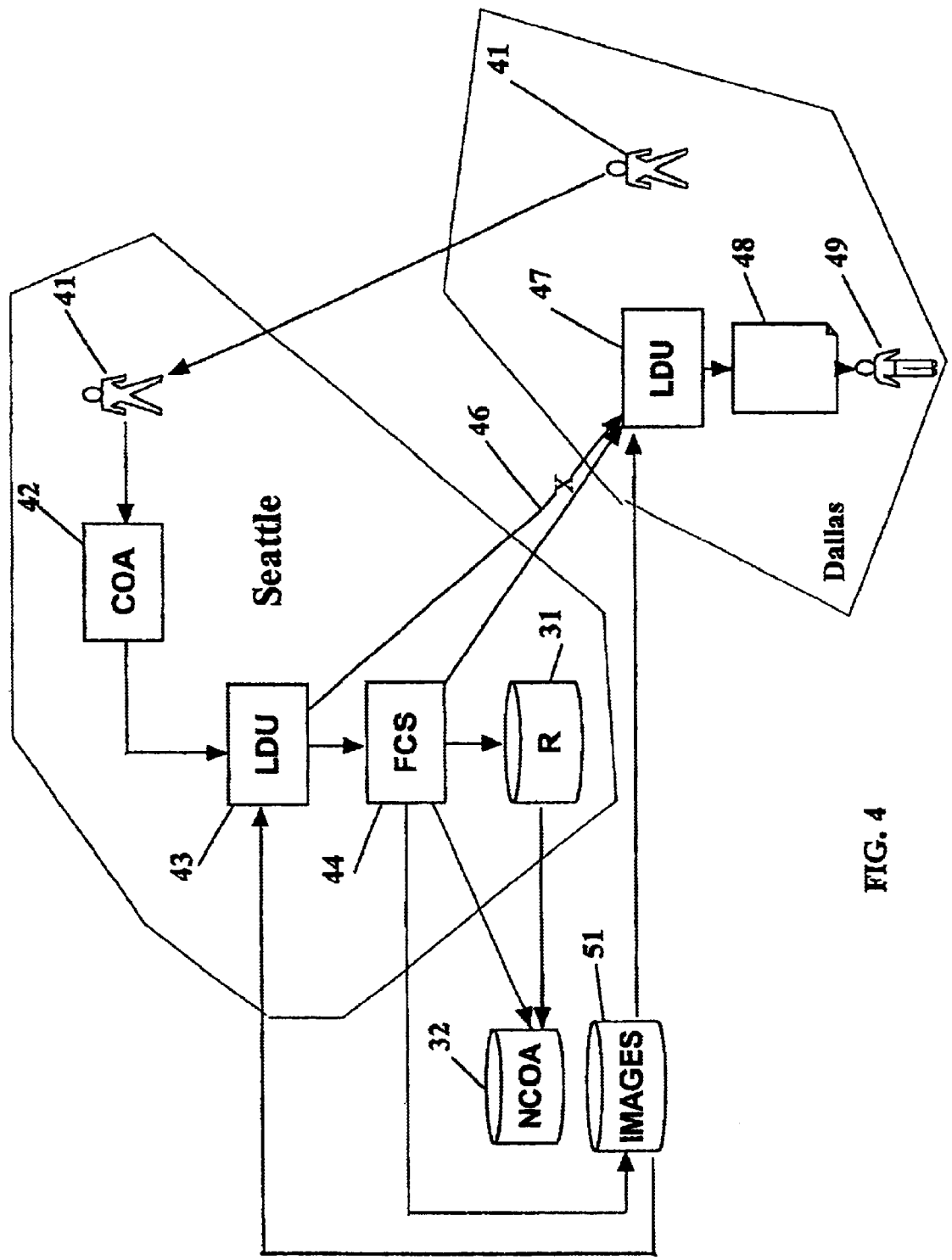
FIG. 4 is a schematic diagram of a change of address process according to the invention.

The system and process of the invention leads to greatly simplified handling of the change of address process as compared to the existing process described above. Referring to FIG. 4, in the case of a person 41 who moves from Dallas to Seattle and files a COA form 42 at a local post office (local delivery unit or LDU) 43 remote from the old address, the Form 3575 or equivalent is sent directly to either a national or regional change of address facility, such as the local CFS 44. The process of the invention is then performed on the paper form at CFS 44, and the form is then discarded or preferably recycled after a relative short time, such as 3 days or less. The conventional step 46 of forwarding the form back to the local post office 47 for the old address is avoided.

The output of the process results in the COA text data and the associated image data from the scan. In particular, VCC 26 may generate the text data in separate formats for a local delivery unit report, the CFS update, and the NCOA update. The COA text data is sent in the assigned report format to local delivery unit 47 for the old address and used to generate an intermediate form 48 for the benefit of the local carrier 49. This could be, for example, a printout of the formatted change of address information, or the information could be entered into a local database record for that carrier and printed out as part of a report or list of all active change of address orders applicable to that carrier's route. In such a manner, the change of address process is not dependent on whether the individual carrier 49 made correct notes of the change, and the expiration of the COA order can be scheduled to happen automatically (the entry is dropped from the report after its age exceeds the limit.) The COA text data is also forwarded to the regional COA database 31 for periodic posting to the NCOA database 32, or may be posted directly to NCOA database 32 as shown with a dotted line in a more centralized system.

The image from the original card is retained on a storage medium such as a hard disk, writeable CD or the like at regional (CFS) facility 44, or can be sent electronically to a centralized national storage facility 51 and can be retrieved online at any local delivery unit 43, 47 if a question arises about the order. The image data archive at facility 51 may be preserved indefinitely or discarded after 18 months in accord with existing practice, but manual filing of the original cards is no longer required. Manual transcription of the information is avoided entirely. If the COA order must be rejected because of a non-existent address or because the information on the form is incomplete and cannot be corrected by editing, then a notice is sent by mail or email as described above advising the sender of the rejection and requesting that the change of address be resubmitted. These notices together with the improved accuracy of the system should greatly reduce the need to field telephone inquiries from postal customers concerning change of address problems.

Historically it has also been necessary for a postal customer to notify businesses he or she does business with such as banks, publishers, utilities and the like of the change of address. This has been done by sending each business a change of address card, or completing change of address information in the space provided on the customer's monthly statement. According to a further option according to the invention, these businesses can provide the postal service with lists of names and addresses of their customers. The postal COA form completed by the customer as described above may have machine scannable blanks thereon (such as boxes) designating categories of businesses the customer may do business with ({[ ] financial institutions, [ ] publishers, [ ] utilities, etc.) as well as one for all businesses registered with the postal service. If the scan determines that any of these blanks have been darkened, the system of the invention, such as through VCC 26 or a separate computer that has access to the valid change of address text data resulting from the scan, checks the name and old address against the lists indicated. If a match is found, the change of address data is automatically provided to that business and the postal customer does not need to notify it separately. After the notifications are completed, the postal customer is sent a report at the new address listing the businesses that were notified, and reminding the customer that other businesses not listed on the email or mailed acknowledgement will have to be notified individually because there were not registered with the automatic change of address notification program. This process saves the customer trouble, provides another service that the postal service can perform for a fee if it wishes, and ultimately improves the speed and reliability of the change of address process. Less mail will have to be forwarded, reducing the postal service's forwarding burden.

Although various embodiments of the invention have been described, it will be understood that the invention is not limited to the embodiments disclosed but, as will be appreciated by those skilled in the art, is susceptible to numerous modifications and variations without departing from the spirit and scope of the invention as hereinafter claimed. The described process is applicable to any information form wherein the information written on the form is to be scanned and entered into a database.

What is claimed is:

1. A method of processing an information form having a set of data elements completed by a submitter of the information form, which set of data elements is maintained in a master database, including the steps of:

(a) scanning a sheet having written information thereon reflecting the data elements to obtain an image;

(b) processing the image with character recognition logic to obtain text data corresponding to the written information;

(c) analyzing the text data with a computer to determine a scanning error probability therein;

(d) if the scanning error probability exceeds a predetermined limit, attempting to correct such error by editing of the text data by at least one of a computer using predetermined correction criteria and a human operator viewing the text data;

(e) checking one or more elements of the text data against a verification database containing information derived from the master database to verify that the information form comprises an update to an identified set of data elements in the verification database;

(f) if the information form comprises an update to an identified set of data elements in the verification database updating the master database to include new or revised text data;

(g) rejecting the text data and aborting updating the master database for such text data that cannot be handled in steps (d)–(f).

2. The method of claim 1, wherein step (c) comprises determining an error probability for each character in the text data, and implementing step (d) if the error probability for any one character exceeds the predetermined limit.

3. The method of claim 1, wherein step (c) comprises determining a first error probability for each character in the text data, and implementing step (d) if the first error probability for any one character exceeds the predetermined limit, or if an overall error probability taking into account error probabilities for multiple characters in the text data exceeds a second predetermined limit.

4. The method of claim 1, further comprising:

performing step (b) at least twice using different character recognition logic, comparing output of each character recognition logic character by character to determine at least two corresponding versions of the text data; and determining the text data by implementing arbitration rules on the versions of the text data.

5. The method of claim 4, wherein when one version contains a different character than the other version at the same position in the text data, the arbitration rules select the character from the version having a lower error probability than the character from the other version.

6. The method of claim 4, wherein the arbitration rules select the character from the version having a lower error probability than the character from the other version only when:

(a) the character with the lower error probability has an error probability lower than a first, predetermined level, and (b) the character in the other version at the same position in the text data has an error probability higher than a second, predetermined level which is higher than the first predetermined level.

7. The method of claim 6, wherein the second predetermined level is at least 10% higher than the first predetermined level.

8. The method of claim 1, wherein step (d) comprises attempting to correct such error by editing of the text data by a human operator viewing the text data on a video display and making changes thereto as needed with a text input device.

9. The method of claim 8, wherein the video display further includes at least a portion of the image obtained in step (a).

10. The method of claim 1, wherein step (d) comprises attempting to correct such error by editing of the text data by at least one of a computer using predetermined correction criteria, and if such correction attempt does not result in successful correction according to predefined criteria, then editing the text data by a human operator viewing the text data on a video display and making changes thereto as needed with a text input device.

11. The method of claim 1, wherein the information form is a postal change of address form, the data elements include a name of a person that wishes mail to be redirected, an old address to which mail for that person was previously sent, and a new address to which mail for that person should be sent, the verification database is a database of valid addresses, and the master database is a national change of address database.

12. The method of claim 1, further comprising:
performing step (a) at least twice on each sheet using different scanning conditions; and
performing step (b) at least twice using the output of each scan of step (a);
comparing output of each character recognition logic character by character to determine at least two corresponding versions of the text data, and
determining the text data by implementing arbitration rules on the versions of the text data.

13. The method of claim 1, further comprising a step (h) of notifying the submitter of the form that the form was rejected in step (g).

14. The method of claim 1, wherein the form comprises a handwritten or printed form.

15. The method of claim 1, further comprising:
performing step (b) at least twice using different character recognition logic to obtain two corresponding versions of the text data;
comparing one or more elements of the corresponding versions of the text data to the verification database to determine whether one of the corresponding versions of the text data contains matching elements; and
if one of the corresponding versions includes matching elements, selecting that version for further processing.

16. A method of processing a change of address form which includes data maintained in a master database of valid postal addresses including a name of a person that wishes mail to be redirected, an old address to which mail for that person was previously sent, and a new address to which mail for that person should be sent, comprising:
(a) scanning a sheet having written change of address information thereon to obtain an image;
(b) processing the image with first character recognition logic to obtain text data of the written change of address information;
(c) analyzing the text data with a computer to detect scanning errors therein,
(d) if a scanning error is detected, attempting to correct such error by a human operator viewing the text data on a display and editing the text data;
(e) checking the new address and the old address against a verification database of valid postal addresses derived from the master data base of valid postal addresses to verify that the information form comprises an update to an identified set of data elements in the verification database,
(f) if the new address and the old address are each found in the verification database of valid postal addresses, updating a change of address database to include the text data;
(g) rejecting the text data and aborting updating the change of address database for such text data that cannot be corrected in step (d) or wherein either the new address or the old address cannot be found in the database of valid postal addresses in step (e).

17. The method of claim 16, wherein step (b) further comprises:
processing the image with second character recognition logic different from the first character recognition logic to obtain second text data of the written change of address information;
comparing first text data obtained from the first character recognition logic with the second text data obtained from the second character recognition logic to create a composite text data which is a combination of the first and second text data which includes alternate interpretations of characters which the first and second character recognition logics interpret differently, and
using the composite text data as the text data analyzed in step (c), wherein alternate interpretations of characters comprise scanning errors sent to a human operator in step (d).

18. The method of claim 16, further comprising a step (h) of notifying a submitter of the change of address form that the change of address form was rejected in step (g).

19. The method of claim 18, wherein step (h) further comprises:
sending the notification to the submitter's new address if the new address was found in the verification database of valid postal addresses but the old address was not found in the master database of valid postal addresses;
sending the notification to the submitter's old address if the old address was found in the verification database of valid postal addresses but the new address was not found in the master database of valid postal addresses.

20. A system for processing a series of information forms having a set of data elements completed by a submitter of the information form, which set of data elements is maintained in a master database, comprising:
a first scanner capable of successively scanning a series of forms having a set of data elements in the form of written information thereon to obtain an image from each form;
first character recognition logic operable on a computer, which character recognition logic generates text data corresponding to the data elements from each image from the first scanner;
error probability logic operable on a computer that analyzes the text data to determine a scanning error probability for the text data;
a verification database containing information derived from the master database to verify that the information form comprises an update to an identified set of data elements in the verification database;
validation logic operable on a computer for checking one or more designated elements of the text data against the verification database, a video coding station usable by a human operator to view and edit the text data, and
handling logic operable on a computer which includes modules for
(i) if the designated data element is found in the verification database, updating a master database to include new or revised text data;
(ii) if the scanning error probability exceeds a certain predetermined limit or the validation logic is unable to find the designated element in the first database, referring the text data to the human operator for review and editing, and (iii) rejecting the text data and aborting updating the second database for such text data that cannot be corrected by the human operator.

21. The system of claim 20, further comprising:

a first computer which receives a signal containing the scanned image from the scanner and operates the first character recognition logic and the error probability logic, and a second computer which receives a signal from the first computer containing the text data, which second computer is connected to the video coding station and which operates the handling logic.

22. The system of claim 20, further comprising second character recognition logic operable on a computer, which second character recognition logic is different from the first character recognition logic, which second character recognition logic generates text data corresponding to the written information from each image, and wherein the error probability logic compares output of each character recognition logic character by character to determine at least two corresponding versions of the text data and determines the text data by implementing arbitration rules on the versions of the text data.

23. The system of claim 20, further comprising:

a second scanner capable of successively scanning a series of sheets having written information thereon to obtain an image from each sheet following scanning by the first scanner; and second character recognition logic operable on a computer, which second character recognition logic generates text data corresponding to the written information from each image from the second scanner, wherein the error probability logic compares output of each character recognition logic character by character to determine at least two corresponding versions of the text data and determines the text data by implementing arbitration rules on the versions of the text data.

24. A system for processing a series of information forms, comprising:

at least one scanner capable of successively scanning a series of sheets comprising the information forms having written information thereon to obtain an image from each sheet;

first character recognition logic operable on a computer, which first character recognition logic generates text data corresponding to the written information from a scanner image;

second character recognition logic operable on a computer, which second character recognition logic generates text data corresponding to the written information from a scanner image; error probability logic operable on a computer that analyzes the text data to determine a scanning error probability for the text data, which error probability logic compares output of each character recognition logic character by character to determine at least two corresponding versions of the text data and determines the text data by implementing arbitration rules on the versions of the text data;

a first database of valid data elements;

validation logic operable on a computer for checking one or more designated elements of the text data against the first database;

automatic error detection and correction logic operable on a computer for making corrections to text data that is not validated by the validation logic by comparison of the text data to records of the first database;

a video coding station usable by a human operator to view and edit the text data in the event that the automatic error detection and correction logic fails to successfully correct the text data; and a second database containing results generated from the automatic error detection and correction logic and the video coding station.

25. The system of claim 24, wherein the form comprises a postal change of address form having data elements for a previous address and a new address.

* * * * *